INVENTORS
JOHN B. HALL, JR.
JAMES C. BRADY
STATEN B. PRICE

ATTORNEYS

INVENTORS
JOHN B. HALL, JR.
JAMES C. BRADY
STATEN B. PRICE

BY

ATTORNEYS

Sept. 28, 1965　　　J. B. HALL, JR., ETAL　　　3,208,272
SURFACE ROUGHNESS DETECTOR
Filed Sept. 28, 1962　　　　　　　　　　　4 Sheets-Sheet 3
FIG. 4
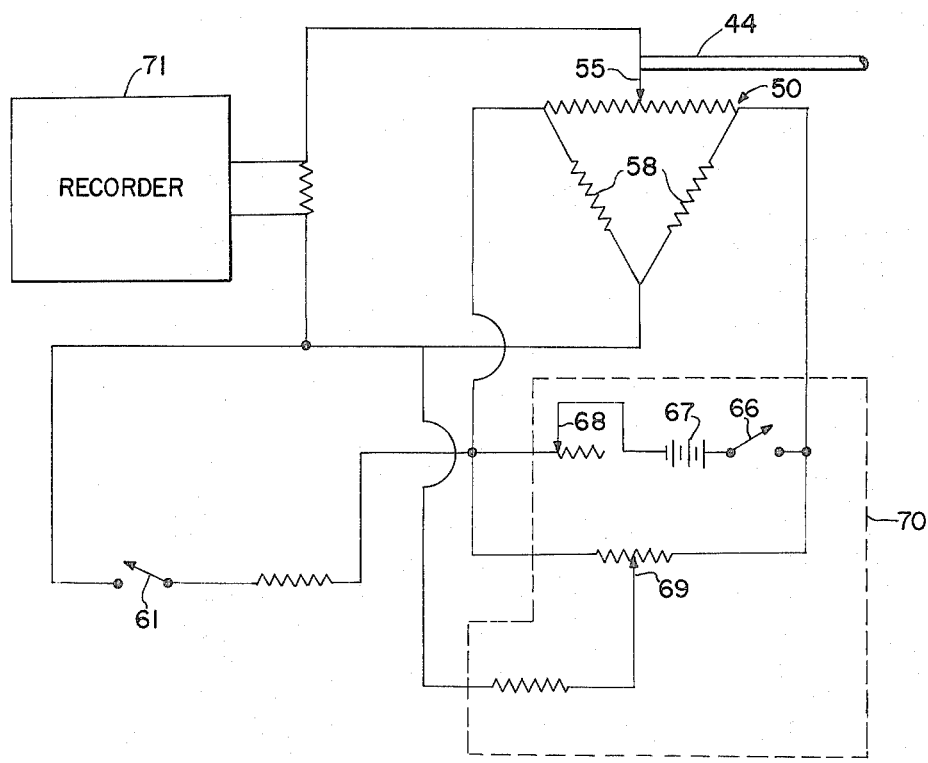
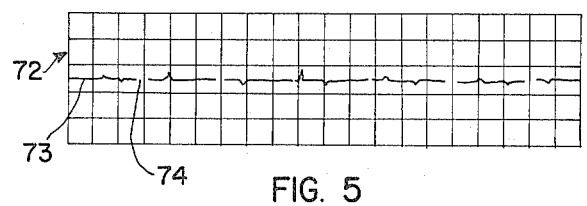
FIG. 5
INVENTORS
JOHN B. HALL, JR.
JAMES C. BRADY
STATEN B. PRICE
BY
ATTORNEYS

INVENTORS
JOHN B. HALL, JR.
JAMES C. BRADY
STATEN B. PRICE

United States Patent Office 3,208,272
Patented Sept. 28, 1965

3,208,272
SURFACE ROUGHNESS DETECTOR
John B. Hall, Jr., Hyattsville, Md., James C. Brady, Baytown, Tex., and Staten B. Price, Hampton, Va., assignors to the United States of America as represented by the Administrator of the National Aeronautics and Space Administration
Filed Sept. 28, 1962, Ser. No. 227,682
16 Claims. (Cl. 73—105)
(Granted under Title 35, U.S. Code (1952), sec. 266)

The invention described herein may be manufactured and used by and for the Government of the United States of America for governmental purposes without the payment of any royalties thereon or therefor.

This invention relates generally to an apparatus for detecting surface roughness of a structure, and more particularly to a simple and speedy roughness detector employing an electronic circuit to detect and record any surface pattern of irregularities of a particular specimen. A graphic representation of the surface is acquired according to the present invention by providing a motor-driven sensitive feeler member adapted for linear movement, at a uniform rate, over the surface area to be investigated, with an electric circuit operatively connected to the feeler member producing detectable and recordable electrical signals in response to any vertical deviation of the sensitive feeler member.

It is desirable in the fabrication of numerous structural elements such as, for example, in the production of precision instrument parts, aerospace vehicle models for testing in wind tunnels, surface panels for aerospace vehicles, and the like, to provide surface areas having maximum smoothness. To aid in accomplishing this result, it is particularly desirable to obtain a trace or pattern of a specimen surface where additional filling in, polishing or machining of the surface is required. Optical flat surfaces probably exhibit the maximum smoothness measurable but even these surfaces may show flaws or waves in the surface area that exceed several millionths of an inch which, obviously, are detectable only through the use of extremely sensitive instruments under the control of highly trained and skilled operators. The normal methods utilized in detecting and measuring surface roughness of various specimen surfaces involves, for example, the use of micrometers or dial gages, which not only require considerable time and skilled operators, but further do not provide a continuous trace or record of the surface roughness pattern.

Accordingly, it is an object of the present invention to provide an inexpensive, sensitive apparatus for accurately measuring the surface roughness of a structure.

Another object of this invention is the provision of an electronic system to detect surface roughness of a test specimen.

A further object of this invention is the provision of a surface roughness detector that produces a continuous trace of the surface roughness pattern.

Yet another object of the instant invention is the provision of indications in a continuous roughness pattern trace at equal intervals relative to distance covered by the trace.

An additional object of the present invention is to provide a novel apparatus for locating the coordinates of a rough spot in a specimen surface.

Another additional object of the present invention is to provide a novel accurate method for detecting surface roughness of a specimen.

Still another object of the instant invention is the provision of a surface roughness detector which can be dependably operated by semiskilled operators.

According to the present invention, the foregoing and other objects are attained by employing a normally balanced electric bridge unit electrically connected to suitable electrical circuitry and mechanically connected to a movable carriage unit which is adapted to traverse the surface profile of a specimen, under the guidance of a track and threaded shaft or worm member. A sensing rod or feeler member carried by the carriage unit maintains contact with the specimen surface. It is provided with an integral rack portion for operative connection with the bridge unit through a spring loaded gear. As the carriage is moved along the guide track by, for example, an electric motor turning the worm, the sensing rod or feeler member maintains contact with the specimen surface under investigation and the rod deflects vertically in response to any deviation from an absolute smooth surface. This rod deflection rotates the associated spring loaded gear member causing an unbalance in the electric bridge with the unbalance being indicated or recorded in terms of rod deflection by a suitable utilization circuit. A normally closed microswitch, movable with the carriage, is included within the recording circuit and is adapted to engage notches or indentations provided at fixed intervals in the guide track. As the microswitch engages each successive notch, the recording circuit is broken causing a corresponding break in the continuous trace being recorded. These periodic breaks in the recording trace establish measurable distances from the end of the guide track and serve as aids in detecting surface areas requiring further machining or polishing.

A more complete appreciation of the invention and many of the attendant advantages thereof will be readily apparent as the same becomes better understood by reference to the following detailed description when considered in connection with the accompanying drawings wherein:

FIG. 4 is a diagram of the electrical circuit utilized in detecting surface profiles according to the present invention;

FIG. 5 is a pictorial view of a portion of a specimen surface pattern recorded during a typical operation of the present invention; and, FIG. 6 is a side elevational view of a modification with parts diagrammatically shown and parts omitted for clarity.

Figure 1:
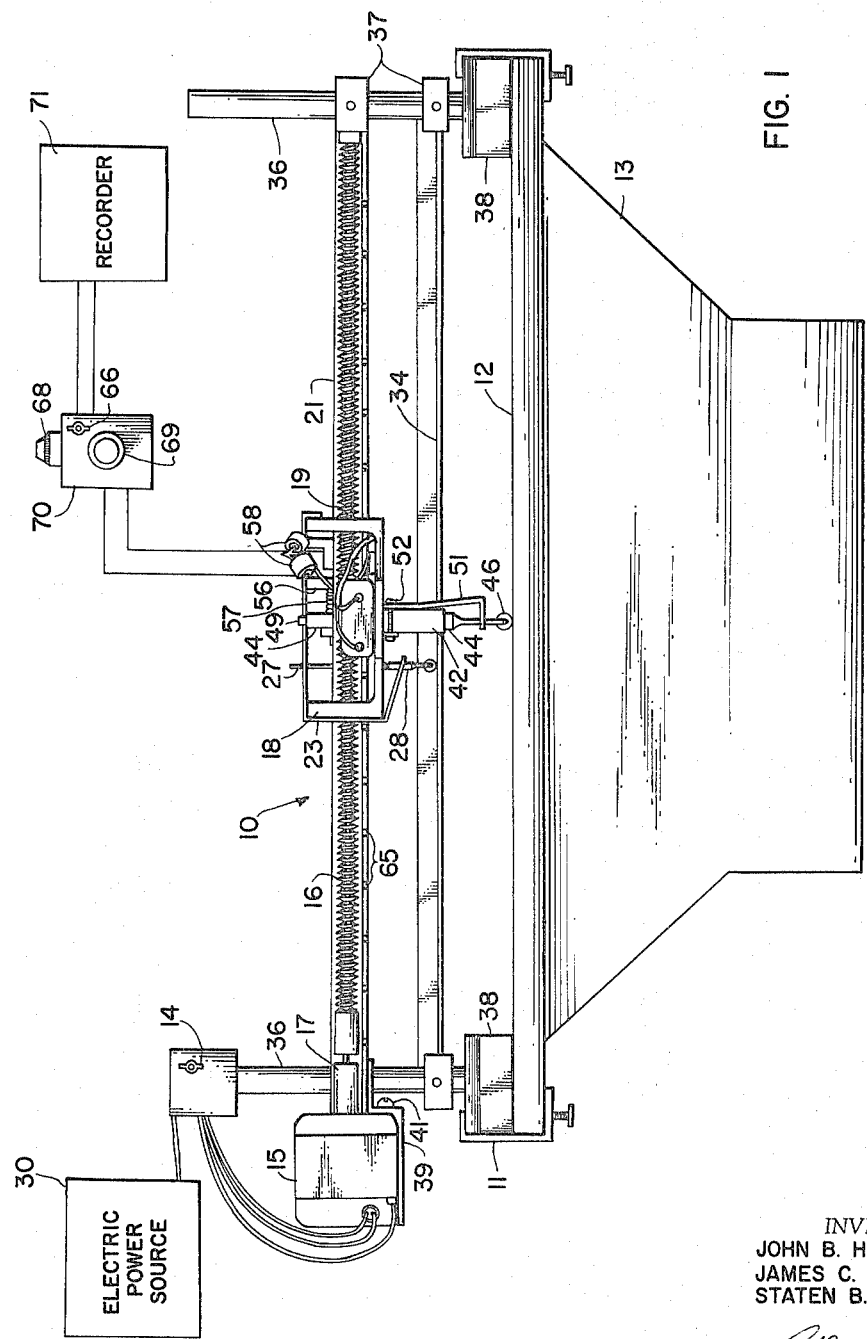
FIG. 1 is a side elevational view of a surface roughness detector according to the present invention in operative position with a specimen and showing a diagrammatic representation of an electric control box and recorder.
Figure 2:
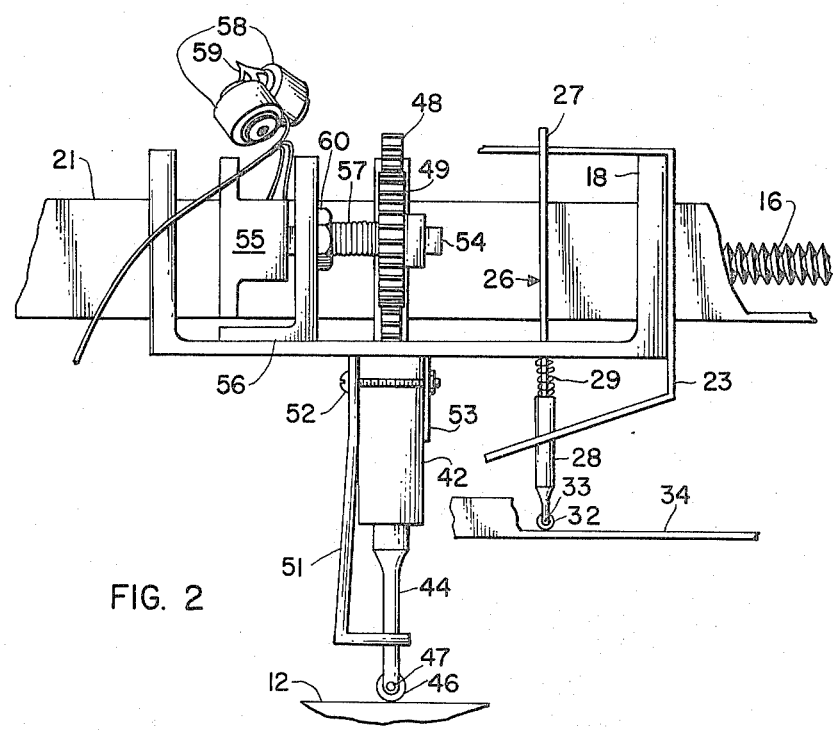
FIG. 2 is a side elevational view showing the back of the carriage unit of the roughness detector shown in FIG. 1 with parts omitted for clarity.

Referring now to the drawings and more particularly to FIGS. 1 and 2, there is shown one embodiment of a surface roughness detector unit, generally designated by reference numeral 10 and secured, for example, by clamps 11 to a specimen 12 which is under investigation for surface roughness. Specimen 12, as well as the remaining structure, is supported by a suitable work table 13.

Roughness detector unit 10 comprises a forward and reverse switch unit 14 leading from a suitable power source 30 and to a reversible electric motor 15 which is geared to a suitable speed and adapted to turn a lead screw or worm 16 through a rubber couple member 17. It is also readily apparent that motor 15 could be replaced by a hand crank or any other suitable means, not shown, if so desired.

An open, substantially-box-shaped, carriage member 18, having internally threaded openings 19 receiving worm 16 through the sidewalls thereof is adapted to be moved horizontally along a guide track 21. Carriage 18 maintains contact with guide track 21 through conforming surface areas and further has a sheet metal bracket member 23 secured across the top and to the side surfaces thereof, extending beyond the bottom of carriage 18. The portion of bracket 23 extending below carriage 18 is bent angularly beneath the carriage terminating with an aperture for the receipt therethrough of one end of a stabilizing arm, generally designated by reference numeral 26 (FIG. 2). Bracket 23 is also provided with an opening 24 (FIG. 3) in the portion thereof that passes across the top of carriage 18. One end of stabilizing arm 26 consists of a cylindrical rod 27 slidably received through the bottom of carriage 18 and opening 24. Rod 27 has an enlarged portion 28 which projects through an aperture in the underlying portion of bracket 23. Spring 29 surrounds rod 27 and is disposed between the bottom surface of carriage 18 and the enlarged portion 28 of rod 27. The lower end of portion 28 terminates with a bifurcated end receiving a small stabilizing wheel 32 rotatably mounted therein and adapted to maintain contact with a horizontal stabilizing track 34 while rotating about an axis 33 as carriage member 18 executes its horizontal movement.

Guide track 21 is parallel to stabilizing track 34 with both track members being attached to vertical arm members 36 by conventional means, such as screw and clamp members 37. Each vertical arm member 36 is connected to a suitable support member, such for example magnetic supports 38. As pointed out heretofore, the entire roughness detector unit 10 may be secured to the specimen structure being investigated through the use of any suitable means, such for example clamps 11, although in most applications of the present invention, and particularly where the structure under investigation for surface roughness is metallic, magnetic supports 38 adequately hold unit 10 in position during operation. Electric motor 15 is suspended from guide track 21 by end bracket 39 and screws 41.

Figure 3:
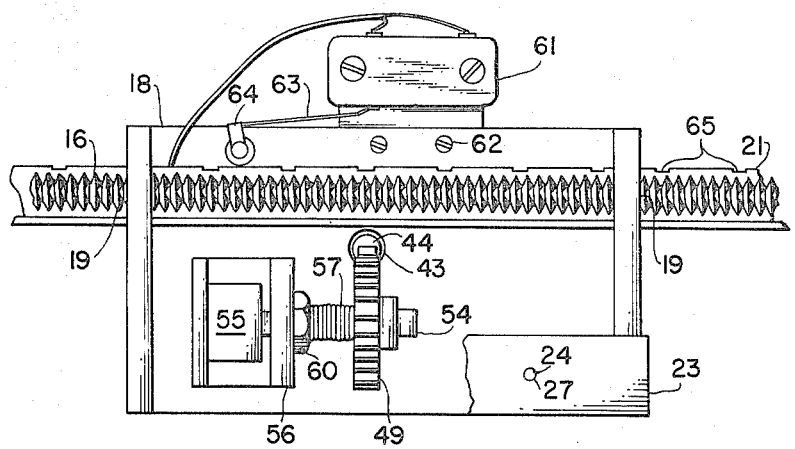
FIG. 3 is an enlarged plan view of a segment of the carriage.

A tubular member 42 is threadingly received in threaded opening 43, FIG. 3, in the bottom of carriage 18 and serves as a holder for sensing rod or feeler member 44. The lower end of sensing rod 44 is bifurcated and receives a small roller member 46 rotatably mounted on spindle 47.

A guide bar 51 formed of rigid sheet metal, similar in shape to a "presser foot" of a sewing machine serves as a guide for the lower end of sensing rod 44. The upper end of guide bar 51 is securely positioned against tubular holder 42 by suitable bolts 52. Bolts 52 (FIG. 2) are fastened to a sheet metal brace 53 which may be welded or otherwise integrally secured to the bottom of carriage member 18.

The upper end of sensing rod 44 has an integral rack portion 48 formed thereon coacting with pinion or gear 49, as shown more particularly in FIG. 2 and FIG. 3. The rotation of gear wheel 49 also effects rotation of horizontal shaft 54 which is secured thereto. The shaft 54 operates as the variable arm of a potentiometer 55. A vertical support 56 for potentiometer 55 is integrally formed with carriage 18, or if desired may be formed separately and secured to the face of carriage 18 by welding or any other suitable means. An externally threaded portion of a tubular nut 60 is threadingly received through a vertical support member 56 and serves as a bearing for journal or shaft 54. A torsion spring 57, having opposite ends connected to gear 49 and tubular member 60 is wound so as to spring load gear 49 and maintain sensing rod 44 in biased contact with work piece or specimen 12. The contact between specimen 12 and roller member 46 of sensing rod 44 is controlled by rotating tubular member 60 to adjust the pressure exerted by spring 57 and thereby assure that the surface of specimen 12 is not marred. Tubular member 60 is provided with a conventional adjustable lock pin arrangement, not shown, which coacts with vertical support 56 to maintain spring 57 under the desired torsional load.

Potentiometer 55 constitutes two arms of a Wheatstone bridge circuit, generally designated by reference numeral 50 (FIG. 4), with resistor elements 58 each being of equal electrical resistance, constituting the other two arms of the bridge unit, as will be more fully explained hereinafter. Rigid electrical connections 59 (FIG. 2) constitute adequate structural support for the lightweight resistors 58 although, obviously, other conventional support means, such as suitable brackets, not shown, may be utilized when desired.

Referring now more particularly to FIG. 3, a normally closed microswitch unit 61 is secured to a portion of carriage member 18, for example by bolts 62, and is used to establish surface irregularities in relation to distance from either end of track member 21 as carriage member 18 is moved therealong. A spring contact 63 maintains microswitch 61 closed until pivotable portion 64 thereof comes in contact with one of the equidistantly disposed notches or indentions 65 on guide track 21. When pivotable member 64 contacts a notch 65, the spring contact 63 pivots to break the circuit and thereby causes a corresponding momentary break in the continuous recorded trace at intervals corresponding to the distance between notches 65, as shown more particularly in FIG. 5.

Referring now more particularly to FIG. 1 and FIG. 4, roughness detector unit 10 is attached to specimen 12 which is under investigation for surface roughness, with carriage 18 positionable at either end of guide track 21 and roller member 46 of sensor rod 44 spring-biased into contact with the surface of specimen 12. An electric control box 70 includes "on-off" switch 66, a battery power supply 67, and sensitive potentiometer 68 all connected in series. Balance potentiometer 69 is connected in parallel with switch 66, battery 67, and sensitive potentiometer 68, and this arrangement is connected in parallel to the Wheatstone bridge 50. A recorder 71 is connected to the movable element of potentiometer 55 and to the opposing end of the bridge circuit 50. The microswitch 61 is in series with the recorder 71. Recorder 71 may be either a current voltage or a continuous-balance type recorder, as desired, and serves to give a continuous trace of an electric signal received thereby. In lieu of, or in addition to, recorder 71 an oscilloscope or other suitable utilization circuit may be employed to indicate the electric signal received through bridge circuit 50.

*Operation*

In operation of the embodiment illustrated in FIGS. 1–5, switch 66 is turned to the "on" position and balance potentiometer 69 and sensitive potentiometer 68 are adjusted to balance bridge circuit 50. Switch 14 for motor 15 is moved to the forward or reverse position, depending upon the initial location of carriage 18 and threaded shaft or worm 16 begins to turn at a predetermined speed causing linear movement of carriage 18 along track 21. As carriage 18 executes its linear movement, sensing rod 44 traverses the surface of workpiece 12 with roller member 46 maintaining contact with the surface area of specimen 12. Any deviation from an absolute smooth surface will be followed by roller 46 and cause a corresponding vertical deflection of sensing rod 44 either upward or downward depending upon whether peaks or valleys are encountered on the surface area under investigation. This rod deflection rotates gear wheel 49 and horizontal shaft 54 moving the adjustable element of potentiometer 55 and thereby creating an unbalance in electric bridge 50. The output from bridge 50 is indicated and recorded by recorder 71 in terms of rod deflection to thereby give a permanent record of the surface pattern.

As mentioned heretofore, while carriage 18 progresses along track 21, spring contact 63 of microswitch unit 61 periodically engages equidistantly spaced notches 65 causing a plurality of momentary breaks in the recording circuit and corresponding breaks 74 (FIG. 5) in the continuous trace 73 of the surface pattern being recorded. These breaks in surface pattern or graph 72 enable even semiskilled operators to establish surface deflections at any distance from either end of the track. Graph or pattern 72 is recorded on a grid surface which is divided into a plurality of known equal dimensioned squares and serves as a scale for the semiskilled operator to establish surface deflections in relation to distance from either end of the track with breaks 74 in the graph also indicating fixed distances on the surface profile being investigated. Thus, by measuring the peaks and valleys present in trace 73 the exact deviations from an absolute smooth surface, as well as the location thereof, are readily established from graph 72. It is possible also for the operator to observe deviations as they occur during recording of the trace and make appropriate indications directly on the model surface at this time. For example, the operator could make a blue pencil mark indicating a valley or depression requiring filling in to make the surface smooth, and a red mark on the model where peaks are noted in the trace to indicate areas requiring further machining or polishing to render the surface profile smooth.

When carriage 18 reaches the opposite end of the track, switch 14 is turned to "off" position to stop motor 15 and a surface pattern has been permanently recorded for one area of specimen 12. The detector unit may then be moved to another area of specimen 12 for roughness determination thereof or, if it is desirable to obtain a duplicate reading for this particular area, motor 15 may be reversed and carriage 18 will retrace the same area of specimen 12. It is particularly desirable to obtain duplicate patterns of one particular area as a check measure where extreme rod deflections have been noted.

Figure 6:
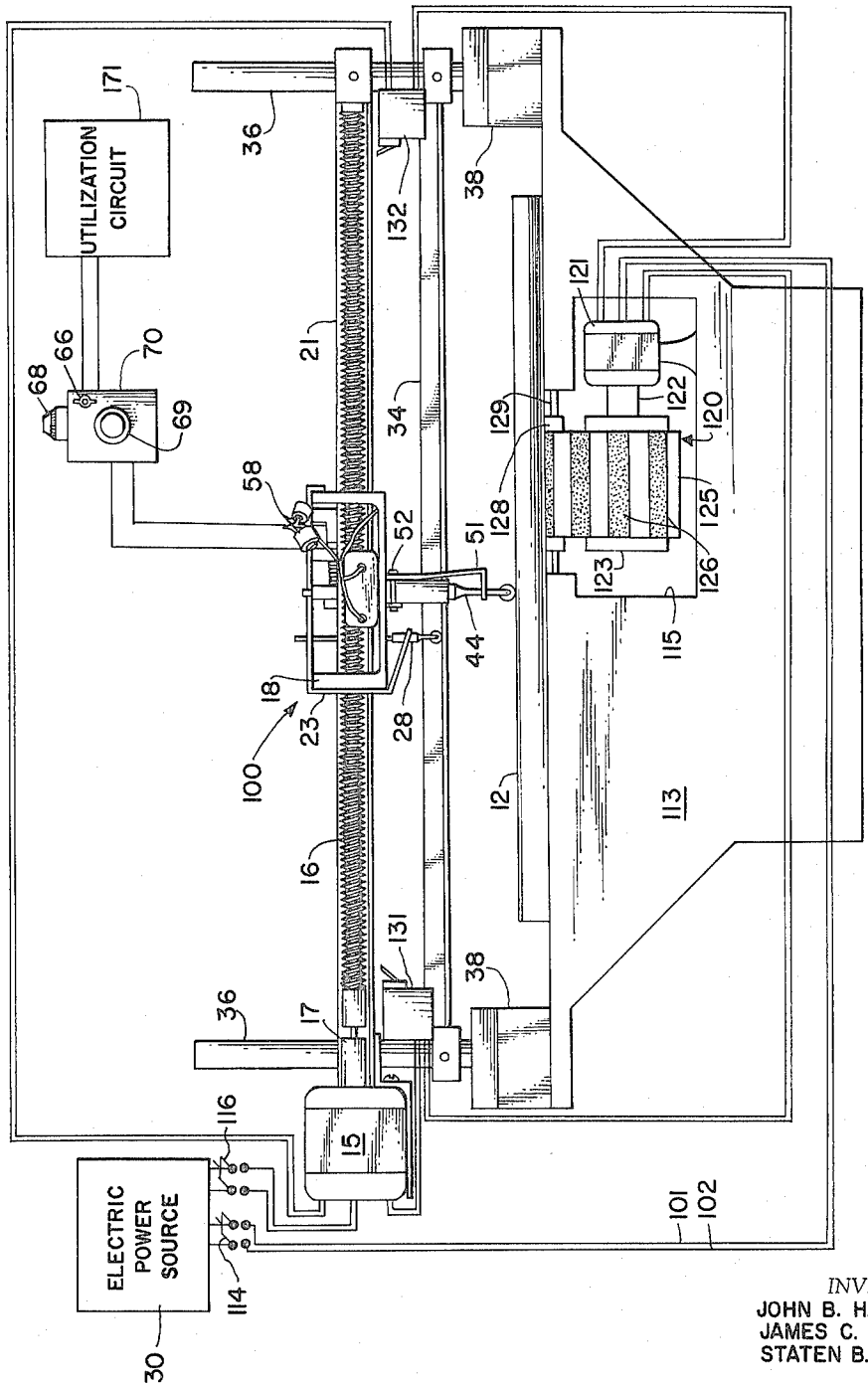

Referring now to FIG. 6, a modified surface reference detector, generally designated by reference numeral 100 is shown positioned on work table 113. Various components of this embodiment are identical to those described hereinbefore and, accordingly, have been given the same reference numeral designation and need not be further described.

Table 113 has exposed metallic surfaces to cooperate with magnetic supports 38, and also is provided with a central cavity 115 having a conveyor assembly, generally designated 120, disposed therein. Conveyor assembly 120 includes a motor 121 electrically connected to a suitable power source 30 through leads 101 and 102 and switch 114. A separate switch 116 connects current source 30 to the reversible motor 15, as will be further explained hereinafter. A shaft 122 extends from motor 121 which serves to turn pulley 123. A belt 125, having a plurality of gripper surfaces 126 disposed on the external surfaces thereof, and the function of which will be further explained hereinafter, extends around pulley 123, and another pulley wheel, not shown, spaced horizontally a distance from pulley 123 within cavity 115. A plurality of rollers, one of which is shown in FIG. 6 and designated by reference numeral 128, are rotatable about individual spindles 129, and disposed in a row along the upper area of cavity 115 with belt 125 adapted to pass thereover essentially flush with the top surface of table 113.

A pair of identical trip switches 131 and 132 are positioned at opposite ends of stabilizing track 34 and adapted to be actuated by carriage 18 upon contact therewith upon movement of carriage 18 a predetermined distance toward either end of lead screw 16. Switches 131 and 132 are each electrically connected to motors 15 and 121, as will be further explained hereinafter. In this embodiment as well as in the previously described embodiment, any suitable utilization circuit 171, such for example as an oscilloscope, a recorder, or the like may be electrically connected to control box 70 to indicate the surface area pattern.

The operation of this embodiment is very similar to that described hereinbefore for the previous embodiment. Workpiece 12 is disposed on table 113 in contact with the gripper surfaces 126 of belt 125. Switches 114 and 116 are then closed to supply power to motors 15 and 121 and upon manual actuation of either switch 131 or 132, carriage 18 starts its scanning movement over the surface area of specimen 12. When carriage 18 reaches the end of its movement along the lead screw 16, contact is made with one of the switches 131 or 132 closing the circuit to motor 121 for a brief interval and causing a stepped or incremental movement thereof to rotate pulley 123 an adjusted increment, which has previously been determined suitable, to thereby move belt 125 and associated specimen 12. At the same time, the actuation of switch 131 or 132 also reverses motor 15 with corresponding reversal of lead screw 16 rotation to cause carriage 18 to move in the opposite direction for determining the surface profile of the newly exposed area of specimen 12.

This sequence is repeated automatically until the entire surface area of specimen 12 has been indicated by utilization circuit 171. Obviously any number of specimens 12 may be automatically fed to the detection apparatus without requiring any stoppage of the apparatus. It is thus seen that this embodiment of the invention is readily applicable to numerous assembly-line operations wherein it is desirable to sequentially determine surface patterns of a number of workpieces or specimens. It is to be understood that switches 131 and 132 are adjustably slidable along stabilization track 34 and adapted to be locked in a conventional manner to any desired position thereon so as to compensate for variable length specimens 12 that may be under surface profile investigation. Switches 131 and 132 are also capable of being hand-actuated independently, when so desired, so as to reverse motor 15 at will, as well as to advance specimen 12 in any desired number of incremental steps, or to maintain specimen 12 in the same position during a subsequent re-run of carriage 18 over a selected specimen surface area.

Another obvious modification of the embodiment illustrated in FIG. 6 would be to arrange roughness detection unit 100 subject to advancement in adjustable incremental steps over the surface area of the specimen 12, instead of having a specimen mounted on a movable surface. This incremental advancement is readily accomplishable by varoius mechanical or electrical systems obvious to those skilled in the art either simultaneously with, or independent to, the reversing of motor 15. Also in lieu of the belt and pulley conveyor arrangement described hereinbefore, it is obviously within the scope of this invention to employ a chain and sprocket wheel, or other conventional, drive assembly to effect the adjustable movement of specimen 12 along work table 113 when so desired.

Although the illustrated embodiments are related to planar surfaces, obviously, the present invention is equally applicable to roughness determination of curved surfaces where any deviation from a predetermined curve would be recorded in functions of rod deflection.

Obviously, there are many other modifications and variations of the present invention possible in the light of the above teachings. For example, in each of the embodiments described, it is possible to replace shaft or worm 16 with a smooth surface rod, or to omit this element entirely, and for the operator to manually slide carriage 18 along track 21 during a surface determination sequence. It is therefore to be understood that within the scope of the appended claims the invention may be practiced otherwise than as specifically described.

What is claimed as new and desired to be secured by Letters Patent of the United States is:

1. Apparatus for producing a pattern of surface roughness of a specimen comprising: a normally balanced bridge circuit having a source of potential, sensing means operatively connected to said bridge circuit to traverse the surface area of said specimen, said sensing means being vertically deflectable in response to any specimen surface irregularities encountered during said traverse with any vertical deflection of said sensing means causing a detachable unbalance in said normally balanced bridge circuit, means to indicate said unbalance as a function of said sensing means deflection, means to cause a plurality of momentary breaks in said indicated signal, said breaks occurring at calibrated intervals and corresponding to specific locations of said sensing means relative to specific distances as traversed along said specimen surface area.

2. Apparatus for determination of surface roughness of a specimen comprising: support means for a specimen; a pair of spaced vertical arm members extending from said support means, first and second horizontal track means equidistantly secured to said vertical arm members, a carriage member slideably supported on said first track means, means for effecting uniform movement of said carriage member along said first track means, stabilizing means for said carriage member and including a stabilizing arm for maintaining continuous contact with said carriage member and said second track means as said carriage member executes movement along said first track, a tubular holder fixedly secured to said carriage member, a sensing element slideably received by said tubular holder and supported by said carriage member in position to contactingly engage the surface of said specimen, said sensing element being adapted to deflect vertically in response to surface irregularities of said specimen, electrical circuit means operatively connected to said sensing element for producing an electric signal, and indicating means to indicate said electric signal as a function of said sensing element deflection.

3. Apparatus according to claim 2 wherein said stabilizing arm comprises a cylindrical rod portion slideably received through said carriage member and an enlarged extension integral with said cylindrical rod portion, said enlarged extension terminating in a bifurcation with a rotatable wheel disposed therein, and spring means interpositioned between said carriage member and said enlarged extension to thereby maintain contact of said rotatable wheel with said second track means.

4. Apparatus according to claim 2 and further including a normally closed microswitch unit carried by said carriage member and electrically connected to said indicating means, a plurality of equidistantly spaced notch means on said first track means, and pivotable means operatively connected to said microswitch unit for successively engaging each of said notch means as said carriage member is moved along said first track member thereby causing a plurality of momentary breaks in said electric signal with said plurality of breaks corresponding to fixed distances of said carriage member from the end of said first track means.

5. Apparatus according to claim 2 wherein said sensing element comprises a vertically disposed rod having a first portion maintaining contact with said specimen surface and a second portion having an integral rack section thereon, a pinion carried by said carriage member and meshed with said rack section, said pinion being attached to one end of a torsion spring, threaded means for adjusting spring tension attached to the other end of said torsion spring, said threaded means also serving to secure said torsion spring to said carriage member, and said torsion spring loading said pinion to maintain said first portion of said rod in contact with said specimen surface.

6. Apparatus according to claim 5 and further including, a shaft member rotatable with said gear wheel, said shaft member rotation effecting a change in said electric signal produced by said electric circuit means.

7. An apparatus according to claim 2 wherein said electrical circuit includes a normally balanced bridge circuit and any vertical deflection of said sensing element causes an unbalance in said normally balanced bridge circuit and a corresponding change in said electrical signal.

8. An apparatus according to claim 2 wherein said means to effect uniform movement of said carriage along said first track includes a lead screw received by threads in said carriage member, and means to selectively control the direction of rotation of said lead screw.

9. An apparatus according to claim 2 and further including, vertical guide means for said sensing element, said vertical guide means being rigidly connected to said tubular holder.

10. An apparatus for determination of surface roughness of a specimen comprising: contact means for traversing said specimen surface, carriage means operatively connected to said contact means for controlling the movement thereof over said specimen surface, a guide track for said carriage means, means for inducing movement of said carriage means along said guide track, means supporting said guide track substantially parallel to said specimen surface, said contact means being deflectable in a vertical direction only in response to any surface irregularities of said specimen surface during movement thereover, a normally balanced bridge circuit operatively connected to said contact means, means operatively connected to said bridge circuit for indicating an electrical signal received due to unbalance of said bridge circuit in terms of contact means deflection, a motor driven lead screw for effecting movement of said carriage means, and support means maintaining said lead screw substantially parallel with said specimen surface, said support means including a pair of magnetic members to assist in fixedly securing said support means in position.

11. A surface roughness detector according to claim 4 wherein said indicating means for indicating said signal records a continuous trace of the surface pattern of said specimen showing the momentary breaks therein caused by said microswitch unit.

12. Apparatus for determination of surface profile of a specimen comprising: sensing means to traverse the surface area of said specimen, an electric circuit for producing a continuous electrical signal in operative electrical connection with said sensing means, means for varying said electrical signal serving to indicate any deviation from an absolute smooth surface encountered on said specimen surface during traverse thereof by said sensing means, means to record a trace of said electrical signal as a function of specimen surface profile and, means momentarily interrupting said signal at calibrated intervals to produce a plurality of breaks in said recorded trace to aid in correlating any detected smooth surface deviation with the specific surface area location.

13. Apparatus according to claim 12 wherein said electric circuit includes a normally balanced bridge, said bridge being electrically connected to said sensing means, guide means for sensing means serving to restrict sensing means movement to vertical deflections, said sensing means being vertically deflectable in response to any specimen surface irregularities encountered during traverse thereof whereby any vertical deflection of said sensing means causes an unbalance in said bridge means and a variance in said continuous electrical signal.

14. A surface roughness detector comprising: in combination, a detection apparatus and a specimen surface under investigation for surface roughness; said detection apparatus including reversible linearly movable scanning means for sequentially traversing incremental portions of said specimen surface, actionable means for selectively effecting relative movement of said specimen and said detection apparatus to present different incremental areas of said specimen surface in position to be traversed by said scanning means, said actionable means being actuated by said linearly movable scanning means at the end of each scanning movement and including a conveyor assembly, and means operatively connected to said scanning means for detecting and indicating specimen surface irregularities.

15. A surface roughness detector as in claim 14 wherein said conveyor assembly includes a belt and pulley arrangement, said belt having gripper surfaces thereon for contact with said specimen to induce movement thereof.

16. A method for determination of surface profile of a test specimen comprising the steps of: supporting a test specimen in position to be traversed by a sensing element, scanning the surface area of said test specimen in incremental portions with a vertically deflectable sensing element, producing an electrical signal in proportion to sensing element deflection caused by surface rough spots encountered by said sensing element, interrupting said signal at precalibrated momentary successive intervals and recording said signal as a function of said sensing element deflection, with the breaks in said signal serving to pinpoint uneven surface areas.

References Cited by the Examiner

UNITED STATES PATENTS

| | | | |
|---|---|---|---|
| 2,020,548 | 11/35 | Harrison | 73—105 |
| 2,620,655 | 12/52 | Priest | 73—105 |
| 2,633,020 | 3/53 | Abbott | 73—105 |
| 2,961,871 | 11/60 | Ricks | 73—105 |
| 3,029,522 | 4/62 | Stolle | 73—105 X |
| 3,056,209 | 10/62 | Oliver | 73—105 X |

FOREIGN PATENTS 585,247  2/47  Great Britain.

LOUIS R. PRINCE, *Primary Examiner.*

DAVID SCHONBERG, RICHARD QUEISSER,
*Examiners.*